United States Patent [19]

Shiraishi

[11] Patent Number: 4,916,321
[45] Date of Patent: Apr. 10, 1990

[54] RADIATION-MEASURING INSTRUMENT

[75] Inventor: Hisashi Shiraishi, Minami-ashigara, Japan

[73] Assignee: Fuji Photo Film Co., Ltd., Kanagawa, Japan

[21] Appl. No.: 918,598

[22] Filed: Oct. 10, 1986

Related U.S. Application Data

[63] Continuation of Ser. No. 614,675, May 29, 1984.

[30] Foreign Application Priority Data

May 27, 1983 [JP] Japan ................... 58-93599

[51] Int. Cl.[4] ............................................. G01T 1/20
[52] U.S. Cl. ............................................. 250/484.1
[58] Field of Search ................. 250/483.1, 484.1, 368, 250/364, 304, 432 R

[56] References Cited

U.S. PATENT DOCUMENTS

| | | | |
|---|---|---|---|
| 3,017,510 | 1/1962 | Roucayrol et al. | 250/364 |
| 3,092,727 | 6/1963 | Payne et al. | 250/432 |
| 3,134,018 | 5/1964 | Schranz | 250/364 |
| 3,288,995 | 11/1966 | Demorest | 250/304 |
| 4,508,636 | 4/1985 | Ochiai | 250/483.1 |

FOREIGN PATENT DOCUMENTS 0174877 10/1983 Japan ................... 250/327.2

Primary Examiner—Janice A. Howell
Assistant Examiner—Richard Hanig
Attorney, Agent, or Firm—Gerald J. Ferguson, Jr.

[57] ABSTRACT

A radiation-measuring instrument which is in the form of a continuous-length material containing a stimulable phosphor therein to measure intensity of a radiation emitted by a liquid sample containing a radioactive substance.

5 Claims, 1 Drawing Sheet

RADIATION-MEASURING INSTRUMENT

This application is a continuation of Ser. No. 614,675, filed May 29, 1984, now abandoned.

BACKGROUND OF THE INVENTION

1. Field of the Invention

The present invention relates to a radiation-measuring instrument, and more particularly, to a radiation-measuring instrument employing a stimulable phosphor.

2. Description of the Prior Art

Heretofore, as a method of measuring a radiation emitted by a liquid sample for detecting a radioactive substance (substance containing a radioisotope) contained therein, there are well known a liquid scintillation counting method wherein the radiation from the sample is converted into fluorescence to be detected by adding to the sample a liquid scintillator composed of a solute (fluorescent agent) dissolved in an organic solvent. In this method, the radioactivity of the radioactive substance contained in the sample is measured by causing the scintillator to absorb at least a portion of radiation energy emitted by the radioactive substance and detecting light (fluorescence) emitted by the scintillator.

The liquid scintillation counting method can be applied to the case where a liquid sample containing a radioactive substance can be continuously or intermittently supplied. The measurement of a radiation emitted by the sample is carried out by collecting a given amount of the sample and adding the liquid scintillator thereinto.

As a method for separation analysis, for example, there is known liquid chromatography wherein a sample solution is introduced into a column packed with a filler such as an adsorbent, an appropriate solvent is then supplied therethrough to develop the sample, and components in the sample are subsequently allowed to flow out from the column and collected. The liquid chromatography can be used for the separation of a sample containing radioactive substance, and the separation and identification of the radioactive substance are conducted by measuring a radiation emitted by an eluate collected through the operation of the liquid chromatography.

More in detail, the separation and identification of a radioactive substance in a sample are conducted by collecting the sample containing the radioactive substance which is separated and developed in the liquid chromatography with a fraction collector, adding a liquid scintillator to each fraction, and then detecting light emitted by the scintillator with a photomultiplier to convert it into an electric pulse and counting the electric pulse to measure the radiation dose of each fraction.

The above-described liquid scintillation counting method has such an advantage that the radioactivity can be detected even when a radiation from a radioactive substance are weak ones such as $\alpha$-rays and $\beta$-rays, and is a useful means for measuring the radioactivity of the liquid sample.

However, when the liquid scintillation counting method is applied to a liquid sample containing a radioactive substance which is supplied continuously or intermittently from the above liquid chromatography, the radioactivity must be detected for every fraction by collecting the sample (which has been separated and developed in the liquid chromatography) by means of a fraction collector composed of a plurality of measuring containers (vials), and then measuring the radiation dose of each container with a scintillation counter.

Accordingly, in order to separate and identify the radioactive substance in the sample with higher accuracy by detecting the radioactivity of the separated and developed sample, it is required to use a great number of measuring containers as the fraction collector. This means that the measuring procedures for collecting the sample solution and detecting the radioactivity becomes more complicated.

The mechanism of scintillation in the liquid scintillation counting method is described as follows: A molecule of a solvent in which a solute (fluorescent agent) is dissolved is initialy excited by a radiation emitted by a radioactive substance in a liquid sample, and then a solute molecule (scintillator) is excited through impingement of the excited solvent molecule on the solute molecule, or the like. In the course of transferring of the radiation energy from the solvent molecule to the solute molecule, there occur other phenomena such that the energy is transferred between the solvent molecules by interaction between the solvent molecule in the excited state and that in the ground state, or that the energy is transferred from the solvent molecule in the excited state to the other solute molecule than a scintillator by interaction therebetween before the scintillator is excited. The transfer of energy takes place not only through the interaction between molecules such as impingement, but also through such a phenomenon that the scintillator absorbs light emitted by the excited solvent molecule or other excited solute molecule.

In the course of the energy-transfer procedure, however, there also occurs such a quenching phenomenon that the excitation energy is absorbed by a portion of the solvent molecules or other solute molecules so as to be converted into heat, etc., or that the light emitted by the scintillator is absorbed by a light-absorbing substance contained in the sample.

The liquid scintillator, which is essential to said liquid scintillation counting method, is expensive and has to be isolated and refined to re-use it. Usually, it is difficult to recover the scintillator in a high purity so that it is not generally re-used and the measuring cost is increased thereby. Further, there are problems in handling thereof. For example, the used scintillator containing the radioisotope may cause a problem in the disposal stage such as environmental pollution.

Other problems reside in that the solvents employable in conjunction the solutes (fluorescent agent) are generally limited to certain organic solvents so that there is difficulty in choosing a solvent for a sample, and a specific procedure has to be taken in preparing a sample in the case that the sample is sparingly soluble in the solvent.

Since the scintillation mechanism of the liquid scintillator is complicated as stated above, the counting efficiency (that is, intensity of radioactivity to be detected) is apt to decrease by the quenching effect due to impurities contained in a sample or of the sample per se. For example, light emitted by the scintillator is liable to be quenched by the oxygen dissolved in the liquid scintillator, or to be absorbed (i.e. quenched) by a colorant in the case that the sample solution is colored thereby. In the case that a sample is sparingly soluble, it is not easy to prepare a sample solution in a homogeneous phase, and the unhomogeneous phase thereof causes internal absorption of a radiation emitted from the sample. For this reason, it is necessary to accurately determine the counting efficiency of the sample by making correction for quenching caused by the above-mentioned various phenomena, and this makes measuring procedure more complicated. Further, there is a disadvantage that it is substantially difficult to accurately measure the radioactivity of the sample even if the correction for quenching is made.

In order to prevent the counting efficiency from being lowered by quenching effect of contaminants, impurities and colored substances contained in the sample, the sample has to be carefully prepared, and high skill and much experience are required for the operators. The pretreatment of the sample to remove the contaminants is of importance to the measuring procedure.

In the conventional scintillation counting method, the measurement of radioactivity of a sample is conducted in a real time. Namely, it is necessary to continuously measure light emitted by the scintillator for a given time (for example, for several minutes to several ten minutes) after the sample is introduced into the scintillator solution. If the intensity of radiation from the sample is low, the measuring time (i.e., counting time) extends to a long time so that it can be hardly said that the measuring efficiency and the handling efficiency of measuring apparatus are sufficiently high. Therefore, in the case that a great number of samples are involved as described above, it is difficult to treat such a great number of samples once, and the waiting period accordingly extends for many hours so that it disadvantageously takes a long time until the results are obtained. Particularly, in the case that the half-life of radioisotope in the sample is short, it becomes difficult to measure the radioactivity thereof. Further, in the case that the radiation intensity is low, the measurement becomes more difficult. This means that an apparatus to be used (for example, dark current drift of photomultiplier) must be stable over a long period of time. To keep the stability of apparatus, an expensive apparatus becomes necessary, or much skill and experience to adjust the apparatus are required.

SUMMARY OF THE INVENTION

The present inventor has made studies to solve the above-mentioned problems associated with the conventional liquid scintillation method which has been employed for measuring radioactivity of a liquid sample containing a radioactive substance, and has found that said problems can be solved or reduced by using a measuring instrument in a continuous-length form (for example, a string form or a tape form) which comprises a material containing a stimulable phosphor.

The present invention provides a radiation-measuring instrument which is in the form of a continuous-length material containing a stimulable phosphor to measure intensity of a radiation emitted by a liquid sample containing a radioactive substance.

BRIEF DESCRIPTION OF DRAWINGS

FIGS. 1(a) to (d) schematically illustrate perspective views of embodiments of the radiation-measuring instrument of the present invention in which:

(a) shows a tape containing a stimulable phosphor dispersed therein, (b) shows a tape composed of a stimulable phosphor layer (1b) containing a stimulable phosphor dispersed therein and a liquid-absorbing layer (2b) provided thereon, (c) shows a yarn composed of a fibrous material containing a stimulable phosphor therein, and (d) shows a fabric composed of a fibrous material containing a stimulable phosphor therein.

Figure 1A:
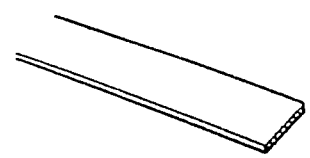
Figure 1B:
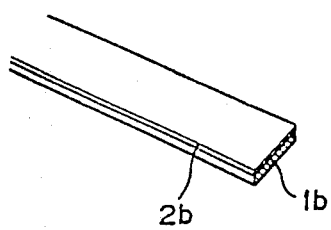
Figure 1C:
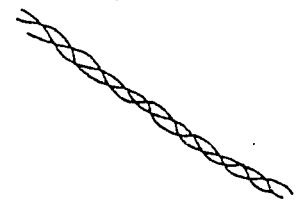
Figure 1D:
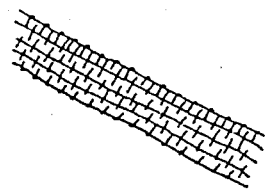
Figure 2:
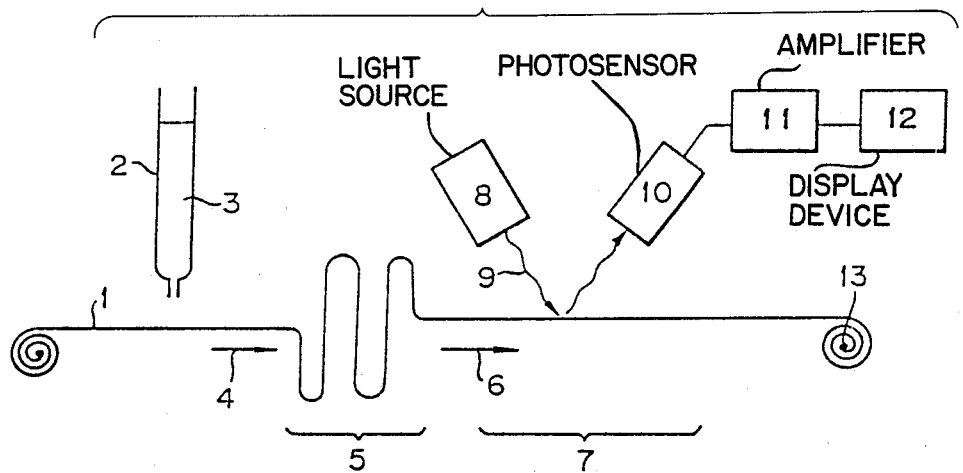

FIG. 2 is a schematic view showing an embodiment of a radiation-measuring system for detecting a radioactive substance contained in a liquid sample which is dropwise supplied continuously.

DETAILED DESCRIPTION OF THE INVENTION

The stimulable phosphor used in the present invention has the property of emitting light (giving stimulated emission) when excited with an electromagnetic wave (stimulating rays) such as visible light or infrared rays after absorbing a radiation. Therefore, the radioactivity of a sample containing a radioactive substance can be measured in such a manner that the sample is supplied onto the radiation-measuring instrument containing the stimulable phosphor to cause the measuring instrument to absorb a radiation emitted by the radioactive substance, the measuring instrument is irradiated with the stimulating rays to release the radiation energy stored in the instrument in proportion to the applied radiation dose as stimulated emission, and the stimulated emission is photoelectrically read out (detected) and converted into an electrical signal.

The radiation-measuring instrument of the present invention is particularly employable for measuring radioactivity of a liquid sample containing a radioactive substance which is supplied to the instrument continuously or intermittently. That is, a radiation emitted by the sample can be continuously adsorbed by the measuring instrument by moving the instrument in its lengthwise direction and allowing the sample to drop or flow down continuously or intermittently onto the moving instrument to deposit the sample thereon. The radiation energy stored in the measuring instrument can be sequentially read out in the form of stimulated emission by irradiating the measuring instrument with stimulating rays. Therefore, it is possible to separate and identify a radioactive substance with high accuracy by sequentially detecting the radioactive substance in the liquid sample which has been continuously flowed down, such as a liquid sample separated and developed in the liquid chromatography.

The stimulable phosphor contained in the measuring instrument gives stimulated emission instantaneously and the photometric time of the emission can be set irrespectively of the radiation intensity of a sample, so that the read-out operation after introducing the sample to the measuring instrument to allow the instrument to store the radiation energy emitted by the sample takes such a short time as from several seconds to several tens seconds. Thus, the measuring time can be shortened.

In the conventional method using a scintillator, the scintillator is added to each container after collecting a liquid sample with a fraction collector, and the radioactivity of each container is measured by a scintillation counter. Thus, the collecting operation of the sample solution and the measuring operation of radioactivity are completely separated from each other. According to the method using the measuring instrument of the present invention, it is possible to carry out both operations in one stage (on-line) by moving the continuous-length measuring instrument containing the stimulable phosphor therein in the lengthwise direction to continuously deposit the sample thereon and subsequently transferring said instrument to subject it to the read-out operation of radiation energy stored therein. In this respect, the measuring time can be shortened and measuring procedure can be greatly simplified.

Therefore, the working efficiency of the apparatus increases, and the number of the measurement per a unit time can be increased. This also means that the radioactivities of a great number of samples can be measured with high accuracy under the same conditions (measuring time, temperature, etc.) even when a radioisotope having a short half-life and a feeble radiation is involved. Further, the measurement of the radioactivity can be carried out with high accuracy under the same conditions only by employing one set of the measuring instrument of the invention and the apparatus used therefor.

It is further possible to automate all the operations involved, that is, the moving operation of the continuous-length measuring instrument, the depositing operation of the sample on the instrument, the storing operation of radiation energy from the sample into the instrument, and the read-out operation of the radiation energy stored therein, so that the total workability can be further improved.

The continuous-length measuring instrument of the present invention does not employ the conventional scintillator and comprises a material such as plastics, so as to be easily handled. For example, the instrument can increase the adsorbing property for liquid sample (e.g., permeability of sample), when the measuring instrument is in the form of a yarn or a fabric, so that a radiation from the sample can be efficiently absorbed by the stimulable phosphor contained in the instrument. After the use of the measuring instrument, it is not necessary to separate the phosphor from the sample and to refine it in the present invention, so that the measuring instrument can be repeatedly used only by removing the sample therefrom and erasing the energy remaining therein under irradiation with an appropriate light, and the cost for one measurement can be reduced. Thus, the measuring procedure can be further simplified by re-using in cycle the measuring instrument in the above-mentioned automated procedure.

Further, a solvent is not necessarily employed for measuring radioactivity by using the measuring instrument of the present invention, which is different from the conventional liquid scintillation counting method. That is, the selection of a solvent and the preparation of a sample solution required in the use of the liquid scintillator are not always required. Further, the above-mentioned quenching phenomena, particularly such as the phenomenon of quenching of the emitted light does not occur in the case of using the measuring instrument of the present invention. It is not necessary to introduce complicated quenching correction (determination of counting efficiency) for measuring the radioactivity of the sample, and the radioactivity thereof can be accurately measured without being greatly influenced by the measuring conditions, etc. Accordingly, the measuring procedure is more simplified in this respect.

Since it is not particularly necessary to remove impurities, etc. contained in the sample, the pretreatment of the sample as stated hereinbefore is not required, and much skill and attention based on the experience are not required for the preparation of the sample. The measurement of the radioactivity of the sample can be easily made further by this feature.

The following illustrates the radiation-measuring instrument of the present invention in more detail.

The radiation-measuring instrument can be prepared, for example, in the following manner.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300-500 nm when excited with stimulating rays in the wavelength region of 400-850 nm.

Examples of the stimulable phosphor employable in the method of the present invention include:

SrS:Ce,Sm, SrS:Eu,Sm, ThO$_2$:Er, and La$_2$O$_2$S:Eu,Sm, as described in U.S. Pat. No. 3,859,527;

ZnS:Cu,Pb, BaO.xAl$_2$O$_3$:Eu, in which x is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$,Mg$_x$,Ca$_y$)FX:aEu$^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

(Ba$_{1-x}$,M$^{II}_x$)FX:yA, in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in Japanese Patent Provisional Publication No. 55(1980)-12145;

M$^{II}$FX.xA:yLn, in which M$^{II}$ is at least one element selected from the group consisting of Ba, Ca, Sr, Mg, Zn and Cd; A is at least one compound selected from the group consisting of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5 \times 10^{-5} \leq x \leq 0.5$ and $0 < y \leq 0.2$, respectively, as described in Japanese Patent Provisional Publication No. 55(1980)-160078;

(Ba$_{1-x}$,M$^{II}_x$)F$_2$.aBaX$_2$:yEu,zA, in which M$^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 10^{-2}$, respectively, as described in Japanese Patent Provisional Publication No. 56(1981)-116777;

$(Ba_{1-x},M^{II}{}_x)F_2.aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 < a \leq 1.25$, $0 \leq x \leq 1$, $10^{-6} \leq y \leq 2 \times 10^{-1}$, and $0 < z \leq 2 \times 10^{-1}$, respectively, as described in Japanese Patent Provisional Publication No. 57(1982)-23673;

$(Ba_{1-x},M^{II}{}_x)F_2.aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x \leq 1$, $10^{-6} \leq y \leq 2 \times 10^{-1}$, and $0 < z \leq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively, as described in Japanese Patent Provisional Publication No. 58(1983)-206678;

$BaFX.xA:yEu^{2+}$, in which X is at least one halogen selected from the group consisting of Cl, Br and I; A is at least one fired product of a tetrafluoroboric acid compound; and x and y are numbers satisfying the conditions of $10^{-6} \leq x \leq 0.2$ and $0 < y \leq 0.1$, respectively, as described in Japanese Patent Provisional Publication No. 59(1984)-27980;

$BaFX.xA:yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in Japanese Patent Provisional Publication No. 59(1984)-47289;

$BaFX.xNaX':aEu^{2+}$, in which each of X and X' is at least one halogen selected from the group consisting of Cl, Br and I; and x and a are numbers satisfying the conditions of $0 < x \leq 2$ and $0 < a \leq 0.2$, respectively, as described in Japanese Patent Provisional Publication No. 59(1984)-56479;

$M^{II}FX.xNaX':yEu^{2+}:zA$, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x \leq 2$, $0 < y \leq 0.2$ and $0 < z \leq 10^{-2}$, respectively, as described in Japanese Patent Provisional Publication No. 59(1984)-56480; and $M^{II}FX.aM^{I}X'.bM'^{II}X''_2.cM^{III}X'''_3.xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively, as described in Japanese Patent Application No. 57(1982)-184455.

The above-described stimulable phosphors are given by no means to restrict the stimulable phosphor employable in the present invention. Any other phosphor can be also employed, provided that the phosphor gives stimulated emission when excited with stimulating rays after exposure to a radiation.

Examples of the material employable in the present invention to encase or retain the stimulable phosphor include: natural polymers such as proteins (e.g. gelatin), polysaccharides (e.g. dextran) and gum arabic; synthetic polymers (plastics) such as polyvinyl butyryl, polyvinyl acetate, nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol and linear polyester; and glass. Particularly preferred are the plastic materials from the viewpoints of the easiness of shaping it and handling the shaped product.

The above-mentioned stimulable phosphor and the material are dissolved or suspended in an appropriate solvent (such as a lower alcohol, a chlorinated hydrocarbon, a ketone, an ester or an ether), or heat-treated to incorporate the phosphor in the material. The material is then shaped into a continuous-length form to produce a measuring instrument containing the stimulable phosphor therein.

The measuring instrument of the present invention may be constructed of a structure wherein the stimulable phosphor is dispersed in the material. Otherwise, the shaped product may be covered with a protective film composed of a transparent polymer material such as polyethylene or polyethylene terephthalate to protect the instrument from chemical deterioration and/or physical shock.

The so-obtained continuous-length measuring instrument containing the stimulable phosphor is preferably in the form of a string or a tape. The diameter or width and the length thereof and the amount of the phosphor to be incorporated therein can be suitably adjusted according to the amount and density of the sample and the measuring conditions.

The measuring instrument is preferable to have a liquid-adsorbing property. The liquid-absorbing property can be imparted to the instrument not only by making it in a liquid-adsorbing structure, but also by processing the surface of the instrument.

As for the method of making the measuring instrument in a liquid-adsorbing structure, for example, there are included a method wherein the material containing the stimulable phosphor is spun into a fibrous material in a known shaping procedure and the fibrous material is processed to obtain a yarn (e.g., twine) having the desired thickness and length; and a method wherein said fibrous material is processed to obtain a fabric having an appropriate thickness and width.

The diameter and length of the so-produced fiber containing the stimulable phosphor and the amount of the phosphor to be incorporated therein can be suitably selected according to the characteristics of the aimed measuring instrument and the measuring conditions.

As for the method of imparting the liquid-adsorbing property to the measuring instrument by the surface processing, for example, there are included a method of subjecting the surface of the shaped product (or protective film) to a surface-activation treatment; and a method of providing a liquid-adsorbing layer on the surface of the shaped product.

Examples of the surface-activation treatment in the former method includes: a chemical treatment with a reagent such as an acid, an alkali or an etching agent; a physical treatment such as a surface-roughing treatment; an electrical treatment such as corona discharge, high-frequency discharge, glow discharge or activated-plasma discharge; a treatment with ultraviolet rays or laser beam; a flame treatment; and an oxidation treatment with ozone; and the like.

In the latter method, various materials can be employed for the liquid-adsorbing layer to receive the aimed sample solution. The materials employable to receive sample solutions ought to be those capable of adsorbing the liquids through a physical adsorbing mechanism such as capillarity, and examples of such material include a fibrous materials such as a paper (e.g., filter paper) and fabrics (e.g., materials of cellulose derivatives, gauze); and porous materials such as porous polymers, porous glass and porous glass-like materials. There may be also employed materials which can be swollen with a solvent of the sample solution, thereby it can absorb the sample solution.

Further, in the case that the solvent of sample solution is a hydrophilic one such as water, examples of the materials of the liquid-adsorbing layer include natural polymer materials such as gelatin, starch, agarose, cellulose, and their derivatives; and synthetic polymer materials such as synthetic homopolymers (for example, polyvinyl alcohol, polyvinyl pyrrolidone, polyacrylamide, polyhydroxyethyl methacrylate) and synthetic copolymers, resulting from the copolymerization of a hydrophylic monomer having a hydrophilic group such as a hydroxyl or carboxyl group with a hydrophobic monomer (for example, unsaturated ethylenic monomers such as ethylene, propylene, styrene, methacrylate, acrylate, vinyl chloride, vinylidene chloride and dienes such as butadiene, isoprene, isobutylene). In the case of a lipophilic solvent is involved as the solvent of the sample solution, examples of the material of the liquid-adsorbing layer include synthetic polymer materials such as nylon, polyethylene and polyester, in addition to those described above.

The provision of the liquid-adsorbing layer on the shaped product can be done, for example, by coating the surface of the shaped product with a solution of the above material dissolved in water or other solvent, or a latex dispersion or by fixing said material thereon with an adhesive agent.

The thickness of the liquid-adsorbing layer varies depending on the kind and amount of the radioactive substance contained in the sample, the kind of the solvent, etc., which can be chosen according to the purpose and is preferably in the range of several $\mu m$ to several mm. It is preferred that the liquid-adsorbing layer is transparent from the viewpoint of transmissibity of stimulating rays and stimulated emission.

In order to increase the adhesion of the liquid-adsorbing layer to the shaped product, the surface thereof may be subjected to such an activation treatment as mentioned above. A plurality of the liquid-adsorbing layers may be formed on the surface of the shaped product.

It is not necessary that the measuring instrument is actively processed all over the surface. For example, when the instrument is in the form of a tape, only one side thereof may be processed. Even when the instrument is composed of a yarn or a fabric, the above-mentioned surface-processing may be applied to increase liquid-adsorbing property.

It is particularly preferred that the measuring instrument of the present invention is a yarn or a fabric which is made of a plastic fiber or glass fiber containing the stimulable phosphor therein, from the viewpoints of the adsorbing property for a liquid sample, the reusability of the instrument and the automatic repeating measurement.

FIGS. 1-(a) to (d) are perspective views schematically illustrating embodiments of the radiation-measuring instrument of the present invention.

(1) FIG. 1-(a) shows a tape-form radiation-measuring instrument in which a stimulable phosphor is dispersed.

(2) FIG. 1-(b) shows a tape-form radiation-measuring instrument comprising a phosphor layer (1b) composed of a stimulable phosphor dispersed therein and a liquid-adsorbing layer (2b) provided thereon.

(3) FIG. 1-(c) shows a yarn (twine)-form radiation-measuring instrument composed of a fibrous material in which a stimulable phosphor is dispersed.

(4) FIG. 1-(d) shows a fabric-form radiation-measuring instrument composed of a fibrous material in which a stimulable phosphor is dispersed.

The above-mentioned four kinds of embodiments of the radiation-measuring instrument are provided only to illustrate the present invention, but are not to be construed as limiting the radiation-measuring instrument of the present invention in any way.

It is not necessary that the stimulable phosphor is dispersed in the measuring instrument throughout the continuous-length material. The phosphor may be partly incorporated in the instrument. For example, the phosphor may be incorporated therein at regular intervals in the lengthwise direction.

A method for detecting a radioactive substance by using the continuous-length radiation-measuring instrument containing the stimulable phosphor of the present invention will be briefly described, referring to an embodiment of the measuring system shown in FIG. 2.

FIG. 2 schematically illustrates an embodiment of a radiation-measuring system for detecting a radioactive substance present in a sample which is allowed to drop continuously.

Samples to be measured in the present invention are liquid samples containing radioactive substances, which may be solutions or dispersions, and may be colored.

As radiations emitted by radioactive substances in the samples, any radiations such as α-rays, β-rays, γ-rays, proton beam, neutron beam, meson beam, cosmic rays and other rays can be measured. Namely, any radiations emitted by any radionuclides can be measured.

A liquid sample 3 in a sample supplier 2 is allowed to drop from the bottom of the supplier on a continuous-length measuring instrument 1 containing a stimulable phosphor. The measuring instrument 1 is moved in the direction of an arrow 4 and the sample-deposited part of the measuring instrument 1 enters a radiation energy-storage section 5.

In the radiation energy-storage section 5, at least a portion of the radiation energy emitted by a radioactive substance in the sample is absorbed by the measuring instrument 1 and stored therein. The storing time of radiation energy varies depending on the intensity of a radiation emitted by the radioactive substance in the sample, the concentration of said substance, the shape of the measuring instrument, the intensity of stimulated emission from the instrument, etc., but usually ranges from several seconds to several tens of seconds. Hence, the moving speed is so adjusted to coincide with the transit time through the storage section 5 with the storing time. If desired, the drying of the sample may be simultaneously conducted in the storage section 5 by warming the measuring instrument 1 and the like.

The sample-deposited part of the measuring instrument 1 leaving the storage section 5 is moved in the direction indicated by an arrow 6 and enters a read-out section 7, where the sample-deposited part of the instrument 1 is irradiated with stimulating rays 9 radiating from a light source 8. It is preferred that the stimulating rays 9 has a beam diameter of at least a size corresponding to the width of the sample-deposited part in perpendicular to the moving direction. When the sample-deposited part of the measuring instrument 1 is irradiated with stimulating rays, said part emits light (gives stimulated emision) being proportional to the radiation energy stored therein. Then, the emitted light enters a photosensor 10 such as photomultiplier. The photosensor 10 is provided with such a filter that allows only light in the wavelength region of the stimulated emission to pass therethrough and cuts off light in the wavelength region of the stimulating rays, so as to detect only the stimulated emission. The emitted light detected by the photosensor 10 is converted into an electric signal, which is then amplified to an appropriate level by an amplifier 11 and input into a recording or displaying device 12.

On the device 12, the level of the electric signal corresponding to the radiation dose absorbed by the measuring instrument, for example, the counted value of an electric pulse is displayed as a digital value. As the recording or displaying device 12, various devices based on various systems can be employed, for example, a device for optically recording by scanning a photosensitive material with laser beam, etc., a device for electronically displaying on CRT, etc., a device for printing a radiation image displayed on CRT by means of a video printer, and a device for recording on a heat-sensitive recording material by using thermic rays.

It is possible that the intensity of radioactivity is calculated on the basis of the resulting digital value according to read-out efficiency (luminance efficiency of stimulated emission) previously input and the storing time of radiation energy, by providing a data processing circuit within the device 12. Further, by inputting the intensity of radioactivity per 1 mole of the radioactive substance, the amount or the concentration of the radioactive substance for each sample-deposited part can be calculated and then the resulting data can be displayed and recorded.

In the above-described method, the operation for reading out the radiation energy of the sample stored in the radiation-measuring instruments containing the stimulable phosphor has been described in detail, but it will be understood that modifications can be made and another operation than that exemplified above can be used.

On the other hand, the measuring instrument 1 leaving the read-out section 7 is wound around a wind-up device 13 to hold it.

The method for detecting the radioactive substance which employs the measuring instrument of the present invention is not limited to that described above, but other methods may be used. For example, the sample portions from which the radioactive substance is detected can be collected before the sample-deposited measuring instrument is wound up, so that the aimed radioactive substance is efficiently separated.

Further, the measuring procedure can be wholly automated by presetting the moving speed of the measuring instrument, the dropping speed of the liquid sample, the read-out speed thereof, the dropping position of the sample thereonto and the read-out position of the energy stored therein.

The used instrument containing the stimulable phosphor can be re-used by washing it with an appropriate solvent and irradiating it with light to erase the remaining energy. Therefore, the instrument can be continually re-used by incorporating the washing operation of the used instrument and the erasing operation of the remaining energy after read-out operation in the process of the measuring procedure to automate the measuring procedure.

Alternatively, when the washing operation of the measuring instrument is done after allowing the instrument to absorb and store radiation energy, the succeeding read-out operation of stimulated emission from the instrument can be easily conducted with high accuracy, for example, in the case that the sample is colored.

The method of detecting a radioactive substance using the radiation-measuring instrument of the present invention is preferably applied to the case of measuring of a small amount of liquid sample supplied continuously, and it is possible to detect the radioactive substance contained in the sample with high accuracy and in short time. Particularly, the method is applied to liquid samples separated and developed in a column, and radioactive substances in the samples can be separated and identified with high accuracy.

What is claimed is:

1. A radiation-measuring element in the form of a continuous plastic material selected from the group consisting of a tape, a string or a continuous fibrous material in which a stimulable phosphor is encased, said element being provided with a liquid-adsorbing structure.

2. The radiation-measuring measuring element as claimed in claim 1, wherein said liquid-adsorbing structure is provided thereto by surface-activation treatment.

3. The radiation-measuring element as claimed in claim 1, wherein said liquid-adsorbing structure is provided by forming a liquid-adsorbing layer thereon.

4. The radiation-measuring element claimed in claim 1, wnherein said stimulable phosphor is a divalent europium activated alkaline earth metal fluorohalide phosphor.

5. The radiation-measuring element as claimed in claim 1, wherein said stimulable phosphor is a rare earth element activated rare element oxyhalide phosphor.

* * * * *